(12) United States Patent
Yu et al.

(10) Patent No.: US 11,062,841 B2
(45) Date of Patent: Jul. 13, 2021

(54) ELECTROMAGNETIC SHIELD DEVICE, WIRELESS CHARGING TRANSMITTING TERMINAL, WIRELESS CHARGING RECEIVING TERMINAL AND SYSTEM

(71) Applicant: NINGBO WEIE ELECTRONICS TECHNOLOGY LTD., Zhejiang (CN)

(72) Inventors: Feng Yu, Zhejiang (CN); Lizhi Xu, Zhejiang (CN); Weiyi Feng, Zhejiang (CN); Xiang Zhu, Zhejiang (CN)

(73) Assignee: NINGBO WEIE ELECTRONICS TECHNOLOGY LTD., Ningbo (CN)

( * ) Notice: Subject to any disclaimer, the term of this patent is extended or adjusted under 35 U.S.C. 154(b) by 0 days.

(21) Appl. No.: 16/201,588

(22) Filed: Nov. 27, 2018

(65) Prior Publication Data

US 2019/0172634 A1 Jun. 6, 2019

(30) Foreign Application Priority Data

Dec. 5, 2017 (CN) .......................... 201711270477.1

(51) Int. Cl.
*H02J 50/10* (2016.01)
*H02J 50/70* (2016.01)
*H01F 27/36* (2006.01)
*H01F 38/14* (2006.01)
*H02J 7/02* (2016.01)
*H01F 27/28* (2006.01)

(52) U.S. Cl.
CPC ......... *H01F 27/36* (2013.01); *H01F 27/2885* (2013.01); *H01F 38/14* (2013.01); *H02J 7/025* (2013.01); *H02J 50/10* (2016.02); *H02J 50/70* (2016.02)

(58) Field of Classification Search
CPC .... H01F 27/365; H01F 27/2885; H01F 38/14; H02J 50/10; H02J 7/025; H02J 50/70
USPC ........................................................... 320/108
See application file for complete search history.

(56) References Cited

U.S. PATENT DOCUMENTS

| 9,460,846 B2 * | 10/2016 | Graham | ................ H01F 27/365 |
| 10,043,612 B2 * | 8/2018 | Graham | ................ H02J 7/0042 |
| 10,340,078 B2 * | 7/2019 | Widmer | ................ B60L 53/122 |

(Continued)

FOREIGN PATENT DOCUMENTS

| CN | 105050372 A | 11/2015 |
| CN | 105101767 A | 11/2015 |

(Continued)

*Primary Examiner* — Nghia M Doan
(74) *Attorney, Agent, or Firm* — Andrus Intellectual Property Law, LLP

(57) ABSTRACT

Provided are an electromagnetic shield device, a wireless charging transmitting terminal, a wireless charging receiving terminal and a system. By providing an electromagnetic shielding device between a power transmitting coil and a power receiving coil and making a magnetic sheet comprised in the electromagnetic shielding device not cover the power receiving coil, the magnetic field acting on the metal material is reduced on one hand and the coupling coefficient between the power transmitting coil and the power receiving coil is increased on the other hand, which reduces the intensity of the emitted magnetic field without changing the required voltage. This reduces an amount of heat and loss during wireless charging and improves charging efficiency.

20 Claims, 3 Drawing Sheets

(56) References Cited

U.S. PATENT DOCUMENTS

| | | | | |
|---|---|---|---|---|
| 2009/0021212 A1* | 1/2009 | Hasegawa | ............... | H01F 38/14 |
| | | | | 320/108 |
| 2014/0152245 A1* | 6/2014 | Choi | .................... | H02J 7/0042 |
| | | | | 320/108 |
| 2014/0375262 A1* | 12/2014 | Yamaguchi | .............. | H01Q 1/38 |
| | | | | 320/108 |
| 2015/0326055 A1* | 11/2015 | Koyanagi | ............ | H04B 5/0093 |
| | | | | 455/573 |
| 2017/0011840 A1 | 1/2017 | Graham et al. | | |
| 2018/0211767 A1* | 7/2018 | Lee | .................... | H01F 27/2885 |

FOREIGN PATENT DOCUMENTS

| | | |
|---|---|---|
| CN | 204810806 U | 11/2015 |
| CN | 205142776 U | 4/2016 |
| CN | 206023289 U | 3/2017 |
| CN | 107800199 A | 3/2018 |

* cited by examiner

ELECTROMAGNETIC SHIELD DEVICE, WIRELESS CHARGING TRANSMITTING TERMINAL, WIRELESS CHARGING RECEIVING TERMINAL AND SYSTEM

CROSS REFERENCE TO RELATED APPLICATION

The present application claims the priority of the Chinese application No. 201711270477.1 with the title of "ELECTROMAGNETIC SHIELD DEVICE, WIRELESS CHARGING TRANSMITTING TERMINAL, WIRELESS CHARGING RECEIVING TERMINAL AND SYSTEM" filed on Dec. 5, 2017, the entire contents of which are incorporated herein by reference.

TECHNICAL FIELD

The present application relates to power electronic technology, in particularly, to wireless charging technology, and more particularly, to an electromagnetic shield device, a wireless charging transmitting terminal, a wireless charging receiving terminal and a system.

BACKGROUND

Wireless charging technology can wirelessly transmit power between electronic devices and is therefore widely used in consumer electronics and other types of electronic products. Wireless charging technology usually achieves wireless transmission of the power through mutual electromagnetic coupling between a coil in a transmitting terminal and a coil in a receiving terminal.

The transmitting terminal converts a direct current voltage into an alternating current that generates an alternating magnetic field through the coil in the transmitting terminal. The receiving terminal couples to the alternating magnetic field to induce a corresponding alternating voltage that is then converted into a direct current voltage by a rectifying circuit to charge an electronic device. The induced voltage generated by the receiving terminal coupling to the alternating magnetic field is:

$$U_s \omega M I_p \qquad (1)$$

where $\omega$ is the frequency of the alternating magnetic field, M is a coupling inductance between the power transmitting coil and the power receiving coil, and $I_p$ is the current in the power transmitting coil which characterizes the intensity of the magnetic field.

Low-frequency induction technology is currently widely used, since w is very small, the coupling inductance M must be increased to increase the induced voltage, but the transmission distance is limited if doing so. Therefore, it is necessary to increase the current $I_p$ in coil in the transmitting terminal (i.e., to increase the intensity of the magnetic field) when it needs to satisfy the requirement of having a sufficient coupling voltage and also realize air charging. However, this will make the charging device to be in a relatively high magnetic field, which causes the metal material in the charging device to generate heat and thus increases power consumption. The low-frequency magnetic field is better at heating metal foreign matter, which also generates extra heat. Therefore, it is especially important to shield the magnetic field around the metal foreign matter during wireless charging.

SUMMARY

In view of this, the present application discloses an electromagnetic shield device, a wireless charging transmitting terminal, a wireless charging receiving terminal and a system, so as to reduce loss and increase coupling coefficient whiling increasing the intensity of the magnetic field.

In the first aspect of the present application, an electromagnetic shield device adapted to be provided between a power transmitting coil and a power receiving coil is provided, the electromagnetic shield device includes a magnetic sheet, wherein the magnetic sheet does not cover the power receiving coil.

Further, the magnetic sheet has a hollow portion with a size corresponding to the power receiving coil.

Further, the electromagnetic shield device further comprises a fixation portion configured to fix the magnetic sheet to an equipment carrying the power receiving coil or a surface of a furniture on which the equipment is placed.

Further, the electromagnetic shield device further comprises a protection casing configured to be combined with an equipment carrying the power receiving coil, and the magnetic sheet is attached to a surface of the protection casing.

Further, the fixation portion is a substrate with an adhesive layer.

In a second aspect of the present application, a wireless charging transmitting terminal is provided which includes: a power transmitting coil configured to wirelessly transmit power; an electromagnetic shielding device adapted to be provided on a side of the power transmitting coil facing a corresponding power receiving coil and separated from the power transmitting coil by a predetermined distance; and wherein the electromagnetic shielding device comprises a magnetic sheet that does not cover the corresponding power receiving coil.

Further, the magnetic sheet has a hollow portion with a size corresponding to the corresponding power receiving coil.

In a third aspect of the present application, a wireless charging receiving terminal is provided which includes: a power receiving coil configured to wirelessly receive power; an electromagnetic shielding device adapted to be provided on a surface of an equipment carrying the power receiving coil; and wherein the electromagnetic shielding device comprises a magnetic sheet that does not cover the power receiving coil.

Further, the magnetic sheet has a hollow portion with a size corresponding to the power receiving coil.

In a fourth aspect of the present application, a wireless charging system is provided which includes: a power transmitting coil configured to wirelessly transmit power; a power receiving coil configured to wirelessly receive power; an electromagnetic shielding device adapted to be provided between the power transmitting coil and the power receiving coil, the electromagnetic shielding device comprising a magnetic sheet, and wherein the magnetic sheet does not cover the power receiving coil.

According to the embodiment of the present application, by providing the electromagnetic shielding device between the power transmitting coil and the power receiving coil and making the magnetic sheet comprised in the electromagnetic shielding device not cover the power receiving coil, the magnetic field acting on the metal material is reduced on one hand and the coupling coefficient between the power transmitting coil and the power receiving coil is increased on the other hand, which reduces the intensity of the emitted magnetic field without changing the required voltage. This reduces an amount of heat and loss during wireless charging.

BRIEF DESCRIPTION OF THE DRAWINGS

The above and other objects, features and advantages of the present application will become more apparent from the following description of the embodiments of the present application with reference to the accompanying drawings in which.

DETAILED DISCLOSURE

Hereinafter, the present application will be described based on the embodiments. However, the present application is not limited to these embodiments. In the detailed description of the present application hereinafter, some specific details will be described exhaustively. For those skilled in the art, the present application may be thoroughly understood without description of these details. In order to avoid confusing the substance of the present application, known methods, processes, flows, elements and circuits will not be described in detail.

In addition, the skilled in the art should understand the drawings provided here are for illustrative purposes, and the drawings are not necessarily drawn in proportion.

Unless explicitly required in the context, the terms "comprise" and "include" and like expressions in the entire description and claims should be interpreted as an inclusive meaning, not an exclusive or exhaustive meaning; in other words, they mean "comprise, but not limited to."

In the description of the present application, it should be understood that the terms "first" and "second" and the like are only for descriptive purposes, and cannot be understood as indicating or implying relative importance. In addition, in the description of the present application, unless otherwise indicated, the meaning of "plural" is two or above.

Figure 1:
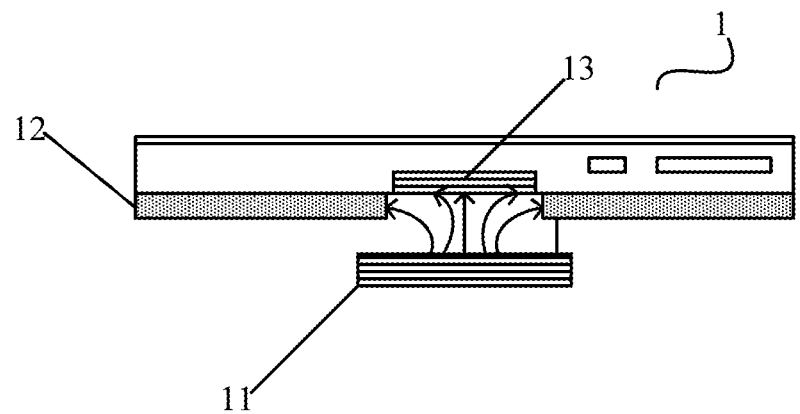
FIG. 1 is a cross-sectional view of a wireless charging system according to an embodiment of the present application.

FIG. 1 is a cross-sectional view of a wireless charging system according to an embodiment of the present application. As shown in FIG. 1, the wireless charging system 1 comprises a power transmitting coil 11, an electromagnetic shielding device 12 and a power receiving coil 13. The electromagnetic shielding device 12 comprises a magnetic sheet with a function of intensifying induced magnetic field and shielding coils from interference in the wireless charging system. In one embodiment, the magnetic sheet may adopt a soft magnetic material such as a NiZn ferrite magnetic sheet and a MnZn ferrite magnetic sheet.

The power transmitting coil 11 is configured to wirelessly transmit power. Specifically, the power transmitting coil 11 generates an alternating magnetic field using an alternating current flowing through the power transmitting coil 11.

The power receiving coil 13 is configured to wirelessly receive power. Specifically, the power receiving coil 13 couples to the alternating magnetic field generated by the power transmitting coil 11 to induce a corresponding alternating voltage that is converted into a direct current voltage by a rectifying circuit in a subsequent circuit to charge a charging device.

The power transmitting coil 11 may be provided at any place where the charging device is convenient for being charged, such as at the bottom of a furniture such as a table, a coffee table or a cabinet. It can also be provided in a box with an arbitrary shape, and the box in which the power transmitting coil 11 is placed is put on a furniture such as a table, a coffee table or a cabinet so that the charging device can be charged.

The power receiving coil 13 may be embedded inside the charging device, and the charging device may be an electronic device such as a mobile phone, a tablet computer or a reader.

The electromagnetic shielding device 12 is adapted to be provided between the power transmitting coil 11 and the power receiving coil 13.

On one hand, the electromagnetic shielding device 12 is used to shield metal material (such as a metal kind device housing, a battery and a circuit board, etc.) around the power receiving coil 13 from the magnetic field to prevent the metal material from generating heat. On the other hand, providing the electromagnetic shielding device 12 between the power transmitting coil 11 and the power receiving coil 13 can increase a coupling coefficient between the power transmitting coil and the power receiving coil, and can reduce the intensity of the magnetic field emitted by the power transmitting coil 11 without changing the voltage as required by the charging device, which further reduces unnecessary loss and improves the efficiency of the wireless charging system. As shown in FIG. 1, the magnetic field that cannot be received by the power receiving coil 13 is received by the electromagnetic shielding device 12 and will not act on the charging device.

Figure 7:
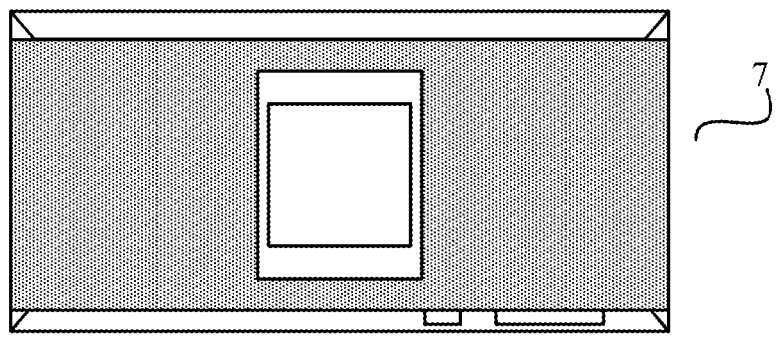
FIG. 7 is a shape schematic view of a magnetic sheet according to an embodiment of the present application.
Figure 8:
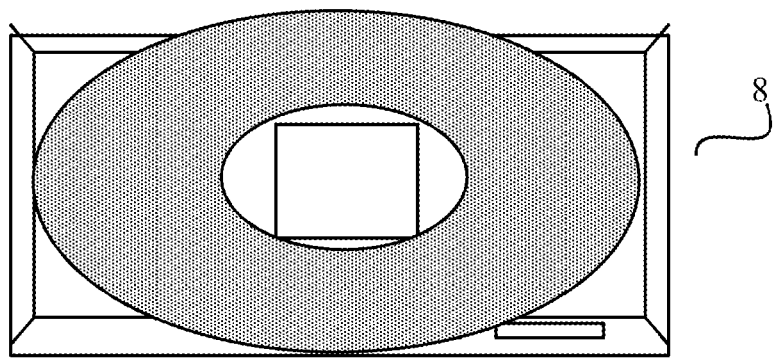
FIG. 8 is a shape schematic view of another magnetic sheet according to an embodiment of the present application.
Figure 9:
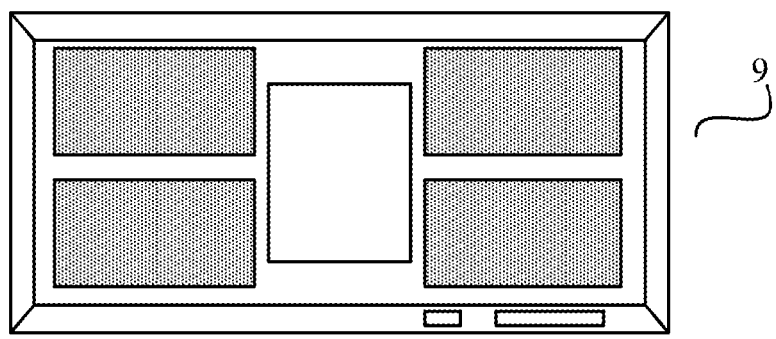
FIG. 9 is a shape schematic view of still another magnetic sheet according to an embodiment of the present application.

The magnetic sheet in the electromagnetic shielding device 12 may have various shapes as shown in FIG. 7, FIG. 8 and FIG. 9. The magnetic sheet may have a hollow portion, and the hollow portion matches the power receiving coil in shape and size so as to be easily smoothly passed through by the magnetic flux of the magnetic field to which the power receiving coil couples. The hollow portion of the magnetic sheet 7 as shown in FIG. 7 is a square hollow matched with a square power receiving coil inside the charging device, and the magnetic sheet 7 covers all other portions of the bottom surface of the charging device except the portion corresponding to the power receiving coil so as to reduce the magnetic field acting on the metal material of the charging device to the most extent. It should be understood that the shape and size of the hollow portion only need to be matched with the power receiving coil and are not limited to those of the magnetic sheet 7 in FIG. 7. For example, the hollow portion of the magnetic sheet can be designed as an elliptical shape and so on.

In one embodiment, since the magnetic field at the edges of the charging device has been significantly reduced, the size of the magnetic sheet can be appropriately reduced in consideration of the cost in combination with shielding effects, such as the magnetic sheet 8 shown in FIG. 8 and the magnetic sheet 9 shown in FIG. 9. The magnetic sheet 8 and its hollow portion all have an elliptical shape and the magnetic sheet 8 does not completely cover all the other portions of the bottom surface of the charging device except the portion corresponding to the power receiving coil but covers most portions of the central area of the bottom surface except four corners of the charging device. This makes it possible to save raw material and reduce production cost on the premise of achieving the purpose of shielding.

The magnetic sheet 9 as shown in FIG. 9 is not formed as a whole but is divided into four parts covering the areas of four corners of the charging device around respectively. It can be seen that the magnetic sheet 9 can still cover most areas of the charging device, which makes it possible to save raw material and reduce production cost on the premise of achieving the purpose of shielding.

In one embodiment, the shielding effect can be improved by increasing the thickness of the magnetic sheet in the electromagnetic shielding device.

According to the embodiment of the present application, by providing the electromagnetic shielding device between the power transmitting coil and the power receiving coil and making the magnetic sheet comprised in the electromagnetic shielding device not cover the power receiving coil, the magnetic field acting on the metal material is reduced on one hand and the coupling coefficient between the power transmitting coil and the power receiving coil is increased on the other hand, which reduces the intensity of the emitted magnetic field without changing the required voltage. This reduces an amount of heat and loss during wireless charging and improves charging efficiency.

Figure 2:
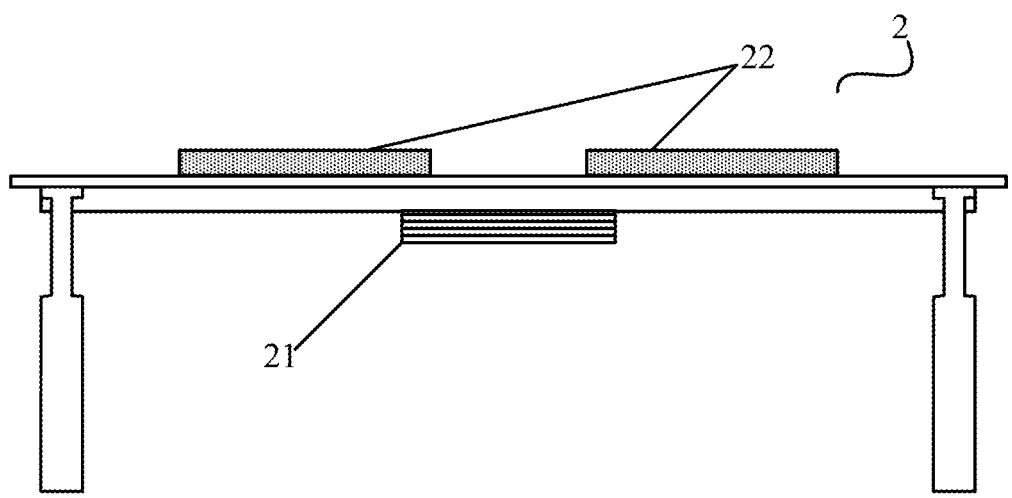
FIG. 2 is a cross-sectional view of a wireless charging transmitting terminal according to an embodiment of the present application.

FIG. 2 is a cross-sectional view of a wireless charging transmitting terminal according to an embodiment of the present application. As shown in FIG. 2, the wireless charging transmitting terminal 2 comprises a power transmitting coil 21 and an electromagnetic shielding device 22. The electromagnetic shielding device 22 comprises a magnetic sheet with a function of intensifying the induced magnetic field and shielding the coil from interference in the wireless charging system. In one embodiment, the magnetic sheet may adopt a soft magnetic material such as a NiZn ferrite magnetic sheet and a MnZn ferrite magnetic sheet.

The wireless charging transmitting terminal 2 can be provided on a furniture such as a table, a coffee table, a cabinet that can be easily for charging. The electromagnetic shielding device 22 is adapted to be provided on a side of the power transmitting coil facing a corresponding power receiving coil and separated from the power transmitting coil 21 by a predetermined distance. For example, the power transmitting coil 21 may be provided on the bottom of a furniture such as a table, a coffee table or a cabinet where it is convenient for charging, and the electromagnetic shielding device 22 is fixed above a corresponding portion above the furniture. The predetermined distance is comprehensively determined according to factors such as the intensity of the magnetic field generated by the power transmitting coil, the thickness of the magnetic sheet and the charging voltage as required by the charging device.

The power transmitting coil 21 is configured to wirelessly transmit power. Specifically, the power transmitting coil 21 generates an alternating magnetic field using the alternating current flowing through the power transmitting coil 21.

On the one hand, the electromagnetic shielding device 22 is used to shield metal material (such as metal kind device housing, a battery, a circuit board, etc.) around the power receiving coil from the magnetic field to prevent the metal material from generating heat. On the other hand, providing the electromagnetic shielding device 22 can increase the coupling coefficient and reduce the intensity of the magnetic field emitted by the transmitting coil 21 without changing the voltage as required by the charging device, which further reduces unnecessary loss and improves the efficiency of the wireless charging system.

The magnetic sheet in the electromagnetic shielding device 22 does not cover the corresponding power receiving coil so that the corresponding power receiving coils can smoothly couple to the magnetic field.

In one embodiment, the magnetic sheet has a hollow portion, and the shape and size of the hollow portion only need to be matched with the power receiving coil. Thus the magnetic sheet and its hollow portion do not have a fixed shape. It can have a square shape, an elliptical shape, a circular shape and other irregular shape.

In order to reduce the magnetic field acting on the metal material of the charging device to the most extent, the magnetic sheet can cover all the portions of the bottom surface of the charging device except the portion corresponding to the power receiving coil. However, since the magnetic field at the edges of the charging device has been significantly reduced, the size of the magnetic sheet can be appropriately reduced to cover most areas of the charging device in consideration of the cost in combination with shielding effects, which will save raw material and reduce production cost on the premise of achieving the purpose of shielding. Some representative shapes of the magnetic sheet are shown in FIG. 7, FIG. 8 and FIG. 9. The magnetic sheet 7 covers all other portions of the charging device except the portion corresponding to the power receiving coil. The magnetic sheet 8 and the magnetic sheet 9 cover most of other portions of the charging device except the portion corresponding to the power receiving coil.

In one embodiment, the shielding effect can be improved by increasing the thickness of the magnetic sheet in the electromagnetic shielding device.

According to the wireless charging transmitting terminal in the embodiment of the present application, by providing the electromagnetic shielding device on a side of the power transmitting coil facing a corresponding power receiving coil and making the magnetic sheet comprised in the electromagnetic shielding device not cover the corresponding power receiving coil, the magnetic field acting on the metal material is reduced on one hand and the coupling coefficient is increased on the other hand, which reduces the intensity of the emitted magnetic field without changing the required voltage. This reduces an amount of heat and loss during wireless charging and improves charging efficiency.

Figure 3:
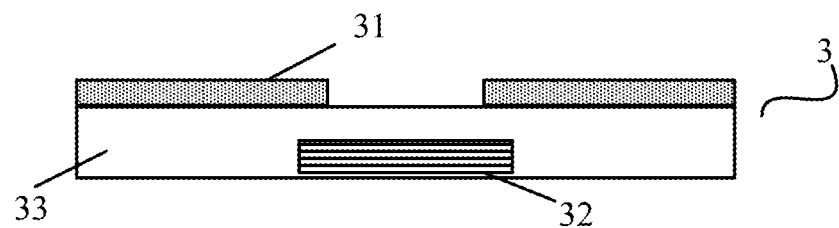
FIG. 3 is a cross-sectional view of another wireless charging transmitting terminal according to an embodiment of the present application.

FIG. 3 is a cross-sectional view of another wireless charging transmitting terminal according to an embodiment of the present application. As shown in FIG. 3, the wireless charging transmitting terminal 3 comprises an electromagnetic shielding device 31, a power transmitting coil 32 and a device 33 for holding the power transmitting coil 32. The device 33 shown in FIG. 3 is a box that can hold the power transmitting coil. It should be understood that there is no specific requirement for the shape of the device 33 as long as it stratifies installation conditions. The wireless charging transmitting terminal 3 can be provided on any plane that is convenient for charging and the charging device does not need to be charged at a fixed location, which makes the charging more flexible and convenient.

Figure 4:
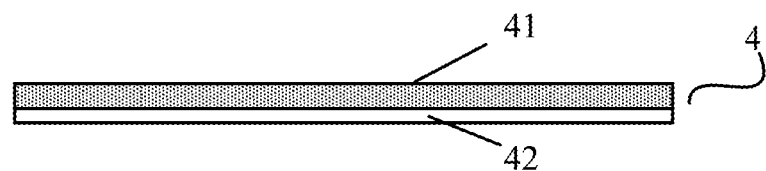
FIG. 4 is a side view of an electromagnetic shielding device according to an embodiment of the present application.

FIG. 4 is a side view of an electromagnetic shielding device according to an embodiment of the present application. As shown in FIG. 4, the electromagnetic shielding device 4 comprises a magnetic sheet 41 and a fixation portion 42 for fixing the magnetic sheet 41. In one embodiment, the fixation portion 42 may be a substrate with an adhesive layer so as to facilitate the fixation of the magnetic sheet 41 to the surface of a furniture or a charging device. In addition, the fixing portion 42 may be a slot or the like corresponding to the size of the magnetic sheet 41. The fixation portion 42 may fix the electromagnetic shielding device 4 on a furniture such as a table, a coffee table, or a cabinet where it is convenient for charging, or may fix the electromagnetic shielding device 4 on a device equipped with a power transmitting coil, and may also fix the electromagnetic shielding device 4 on a charging device. The flexibility of the electromagnetic shielding device 4 in fixation location makes the charging device more flexible and convenient for being charged.

Figure 5:
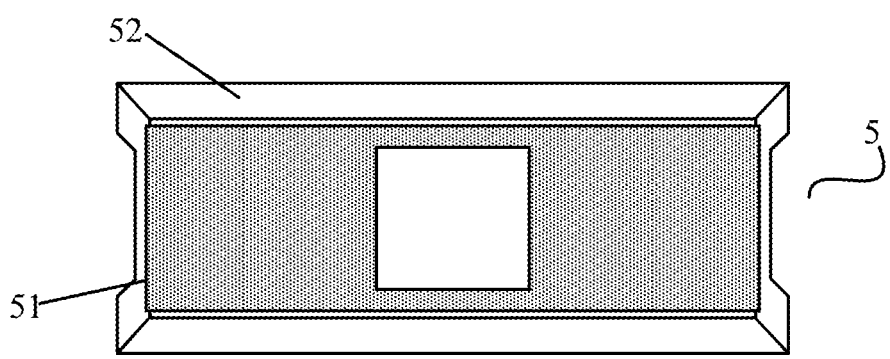
FIG. 5 is a top view of another electromagnetic shielding device according to an embodiment of the present application.

FIG. 5 is a top view of another electromagnetic shielding device according to an embodiment of the present application. As shown in FIG. 5, the electromagnetic shielding device may further comprise a protective casing 52 corresponding to the charging device, that is, the magnetic sheet 51 is fixed on the protective casing 52 of the charging device. The charging device with the electromagnetic shielding device 5 may be charged by placing it on a plane on which the power transmitting coil is mounted. It should be understood that a corresponding power receiving coil is embedded in the charging device with the electromagnetic shielding device 5 and the position of the power transmitting coil corresponds to the position of the corresponding power receiving coil.

On the one hand, the electromagnetic shielding device is used to shield the metal material (such as metal-kind device housing, a battery, a circuit board, etc.) around the power receiving coil from the magnetic field to prevent the metal material from generating heat. On the other hand, providing the electromagnetic shielding device can increase coupling coefficient and can reduce the intensity of the magnetic field emitted by the transmitting coil 21 without changing the voltage as required by the charging device, which further reduces unnecessary loss and improves the efficiency of the wireless charging system.

Figure 6:
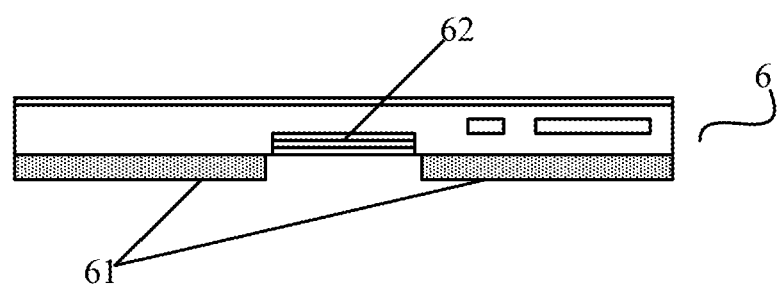
FIG. 6 is a cross-sectional view of a wireless charging receiving terminal according to an embodiment of the present application.

FIG. 6 is a cross-sectional view of a wireless charging receiving terminal according to an embodiment of the present application. The wireless charging receiving terminal 6 comprises an electromagnetic shielding device 61 and a power receiving coil 62 and the power receiving coil 61 is embedded in the charging device. The charging device can be an electronic device such as a mobile phone, a tablet or a reader. The electromagnetic shielding device 61 comprises a magnetic sheet with a function of intensifying induced magnetic field and shielding the coil from interference in the wireless charging system. In one embodiment, the magnetic sheet may adopt a soft magnetic material such as a NiZn ferrite magnetic sheet and a MnZn ferrite magnetic sheet.

The power receiving coil 62 is configured to wirelessly receive power. Specifically, the power receiving coil 13 couples to an alternating magnetic field generated by a corresponding power transmitting coil to induce a corresponding alternating voltage that is converted into a direct current voltage by a rectifying circuit in a subsequent circuit to charge a charging device.

The electromagnetic shielding device 61 is adapted to be provided on the surface of a charging device carrying the power receiving coil 62, such as the electromagnetic shielding device shown in FIG. 4 or FIG. 5.

On the one hand, the electromagnetic shielding device 61 is used to shield the metal material (such as a metal kind device housing, a battery, a circuit board, etc.) around the power receiving coil from the magnetic field to prevent the metal material from generating heat. On the other hand, providing the electromagnetic shielding device 61 can increase coupling coefficient and reduce the intensity of the magnetic field without changing the voltage as required by the charging device, which further reduces unnecessary loss and improves the efficiency of the wireless charging system.

The magnetic sheet in the electromagnetic shielding device 61 does not cover the power receiving coil 62 so that the power receiving coil 62 can smoothly couple to the magnetic field.

In one embodiment, the magnetic sheet has a hollow portion, and the shape and size of the hollow portion only need to be matched with the power receiving coil. Thus the magnetic sheet and its hollow portion do not have a fixed shape. It can have a square shape, an elliptical shape, a circular shape and other irregular shapes.

In order to reduce the magnetic field acting on the metal material of the charging device to the most extent, the magnetic sheet can cover all the portions of the bottom surface of the charging device except the portion corresponding to the power receiving coil. However, since the magnetic field at the edges of the charging device has been significantly reduced, the size of the magnetic sheet can be appropriately reduced to cover most areas of the charging device in consideration of the cost in combination with shielding effects, which will save raw material and reduce production cost on the premise of achieving the purpose of shielding. Some representative shapes of the magnetic sheet are shown in FIG. 7, FIG. 8 and FIG. 9. The magnetic sheet 7 covers all other portions of the charging device except the portion corresponding to the power receiving coil. The magnetic sheet 8 and the magnetic sheet 9 cover most of other portions of the charging device except the portion corresponding to the power receiving coil.

In one embodiment, the shielding effect can be improved by increasing the thickness of the magnetic sheet in the electromagnetic shielding device.

According to the power receiving terminal in the embodiment of the present application, by providing an electromagnetic shielding device on the surface of the charging device carrying the power receiving coil and making the magnetic sheet comprised in the electromagnetic shielding device not cover the corresponding power receiving coil, the magnetic field acting on the metal material is reduced on one hand and the coupling coefficient is increased on the other hand, which reduces the intensity of the magnetic field without changing the required voltage. This reduces an amount of heat and loss during wireless charging and improves charging efficiency.

What are described above are only some embodiments of the present application and are not intended to limit the present application. To those skilled in the art, the present application may have various alternations and changes. Any modifications, equivalent replacements and improvements made within the spirit and principle of the present application should be included within the protection scope of the present application.

The invention claimed is:

1. An electromagnetic shield device adapted to be provided between a power transmitting coil having a first surface and a power receiving coil having a second surface, the first and second surface facing each other, comprising:
   a planar magnetic sheet,
   wherein the magnetic sheet does not cover the power receiving coil, and wherein in a normal direction of the planar magnetic sheet, a plane where the planar magnetic sheet is located between the first surface of the power transmitting coil and the second surface of the power receiving coil, and the planar magnetic sheet is partially overlapped with the power transmitting coil.

2. The electromagnetic shield device of claim 1, wherein the magnetic sheet has a hollow portion through the magnetic sheet, an area of the hollow portion being the same as or larger than an area of the power receiving coil and the area of the hollow portion being smaller than an area of the power transmitting coil.

3. The electromagnetic shield device of claim 1, wherein the power receiving coil is inside an electronic device, and the electromagnetic shield device further comprises a fixation portion configured to fix the magnetic sheet to an outer surface of the electronic device.

4. The electromagnetic shield device of claim 3, wherein the fixation portion is a substrate with an adhesive layer.

5. The electromagnetic shield device of claim 1, wherein the electromagnetic shield device further comprises a protection casing configured to be combined with an electronic device carrying the power receiving coil, and the magnetic sheet is attached to a surface of the protection casing.

6. The electromagnetic shield device of claim 1, wherein the electromagnetic shield device further comprises a fixation portion, the power receiving coil is inside an electronic device, and the fixation portion is configured to fix the magnetic sheet to a surface of a furniture on which the electronic device is placed.

7. The electromagnetic shield device of claim 1, wherein the power receiving coil is inside an electronic device, and the magnetic sheet covers all other portions of the electronic device except the power receiving coil.

8. The electromagnetic shield device of claim 1, wherein the power transmitting coil is inside a box, the electromagnetic shield device further comprises a fixation portion, and the fixation portion is configured to fix the magnetic sheet to the box.

9. The electromagnetic shield device of claim 1, wherein the power receiving coil is inside an electronic device, and the magnetic sheet is fixed on a protective casing of the electronic device.

10. A wireless charging transmitting terminal comprising:
a box;
a power transmitting coil inside the box and configured to wirelessly transmit power to a corresponding power receiving coil; and
an electromagnetic shielding device;
wherein the electromagnetic shielding device comprises a planar magnetic sheet that does not cover the corresponding power receiving coil,
wherein in a normal direction of the planar magnetic sheet, a plane where the planar magnetic sheet is located between mutually facing surfaces an upper surface of the power transmitting coil and a lower surface of the power receiving coil, and the planar magnetic sheet is partially overlapped with the power transmitting coil.

11. The wireless charging transmitting terminal of claim 10, wherein the magnetic sheet has a hollow portion.

12. The wireless charging transmitting terminal of claim 10, wherein the electromagnetic shield device further comprises a fixation portion, and the fixation portion is configured to fix the magnetic sheet to a surface of a furniture on which the box is placed.

13. The wireless charging transmitting terminal of claim 10, wherein the magnetic sheet is attached to an outer surface of the box.

14. The wireless charging transmitting terminal of claim 10, wherein the power receiving coil is inside an electronic device, and the magnetic sheet covers all other portions of the electronic device except the power receiving coil.

15. An electronic device comprising:
a power receiving coil configured to wirelessly receive power from a power transmitting coil; and
an electromagnetic shielding device adapted to be provided on a surface of the electronic device;
wherein the electromagnetic shielding device comprises a planar magnetic sheet that does not cover the power receiving coil,
wherein in a normal direction of the planar magnetic sheet, a plane where the planar magnetic sheet is located between mutually facing surfaces an upper surface of the power transmitting coil and a lower surface of the power receiving coil, and the planar magnetic sheet is partially overlapped with the power transmitting coil.

16. The electronic device of claim 15, wherein the magnetic sheet has a hollow portion.

17. The electronic device of claim 15, wherein the electromagnetic shield device further comprises a fixation portion, and the fixation portion is configured to fix the magnetic sheet to a surface of a furniture on which the equipment is placed.

18. The electronic device of claim 15, wherein the magnetic sheet covers all other portions of the electronic device except the power receiving coil.

19. A wireless charging system comprising:
a power transmitting coil configured to wirelessly transmit power;
a power receiving coil configured to wirelessly receive power; and
an electromagnetic shielding device adapted to be provided between the power transmitting coil and the power receiving coil, the electromagnetic shielding device comprising a planar magnetic sheet,
wherein the magnetic sheet does not cover the power receiving coil,
wherein in a normal direction of the planar magnetic sheet, a plane where the planar magnetic sheet is located between mutually facing surfaces an upper surface of the power transmitting coil and a lower surface of the power receiving coil, and the planar magnetic sheet is partially overlapped with the power transmitting coil.

20. The wireless charging system of claim 19, wherein the power receiving coil is inside an electronic device, and the magnetic sheet covers all other portions of the electronic device except the power receiving coil.

* * * * *